FEEDBACK OSCILLATOR WITH PLURAL FORWARD TRANSMISSION PATHS

Filed May 29, 1962 6 Sheets-Sheet 1

Inventors
K. ISHIMOTO
K. NAKAMURA
By [signature]
AGENT

Inventors
K. ISHIMOTO-
K NAKAMURA
By Arthur M. Lieberman
AGENT

Inventors
K. ISHIMOTO-
K. NAKAMURA
By [signature]
AGENT

FEEDBACK OSCILLATOR WITH PLURAL FORWARD TRANSMISSION PATHS

Filed May 29, 1962

Inventors
K. ISHIMOTO
K. NAKAMURA
By Arthur M. Lieberman
AGENT

March 22, 1966 KUNIO ISHIMOTO ETAL 3,242,442

FEEDBACK OSCILLATOR WITH PLURAL FORWARD TRANSMISSION PATHS

Filed May 29, 1962 6 Sheets-Sheet 5

Inventors
K. ISHIMOTO-
K. NAKAMURA
By Arthur M. Lieberman
AGENT

Inventors
K. ISHIMOTO
K. NAKAMURA
By Arthur M. Lieberman
AGENT

United States Patent Office 3,242,442

Patented Mar. 22, 1966

3,242,442
FEEDBACK OSCILLATOR WITH PLURAL FORWARD TRANSMISSION PATHS

Kunio Ishimoto and Kiyoshi Nakamura, Minato-ku, Tokyo, Japan, assignors to Nippon Electric Company, Limited, Minato-ku, Tokyo, Japan, a corporation of Japan Filed May 29, 1962, Ser. No. 198,609
Claims priority, application Japan, May 29, 1961, 36/18,987
9 Claims. (Cl. 331—183)

This invention relates to a current supply equipment or an oscillator for supplying signal current having a predetermined frequency and amplitude and in particular to such equipment of the continuously operable type.

With conventional current supply equipment, as is well known, signal transmission may be seriously hampered by supply equipment malfunctions instigating variations in gain, phase and like parameters; or completely impaired by the failure of this equipment. With the advent of modern communication techniques (e.g. TDM PCM, etc.) a demand to obviate such instability has arisen.

FIGURES 1 and 2 are illustrative of arrangements which have ben developed to meet the stringent requirements of modern equipment.

The system shown in FIG. 1 consists of two independent oscillators $O_1$ and $O_2$ which provide two separate forwarded transmission paths and a switching circuit for supervising the two outputs and for deriving the normal output of either to furnish the required current, via the switching circuit to a load. With this system, however, an instantaneous interruption of the current in the switching operation is inevitable. Further, while the output of $O_1$ is being utilized it is susceptible to induction from $O_2$ (also operational but not on-line) resulting in a beat frequency equal to the difference in frequency between the two currents. Depending upon the application, therefore, the necessity of suppressing this induction arises. This makes the construction of the switching circuit appreciable complex, and in turn, prolongs the switching time (that is, the interruption time-interval of the supply current) and gives rise to other troublesome aspects.

The system of FIGURE 2 is an alternative approach to the problem. Here both oscillators $O_1$ and $O_2$ are continuously on-line in the forward transmission paths. The oscillators are maintained in synchronism by synchronizer S, and their outputs are sustained 120° out of phase by phase shifters $PS_1$ and $PS_2$; the signals being combined at the hybrid circuit H. This system has inherent defects, however, in that when either oscillator malfunctions the output vector varies both in magnitude and phase; the former remaining within the fairly acceptable limits of 1.2 db, but the latter deviating as much as $\pi/3$ radians. The present invention is generally concerned with overcoming the problems inherent in the prior art systems of FIGS. 1 and 2. However, the new feedback control system disclosed herein will be recognized by one skilled in the art to be applicable to any control arrangement having one or more forward transmission paths.

It is therefore the object of this invention to provide a current supply equipment having stable output characteristics and good reliability.

The above mentioned and other features and objects of this invention and the manner of attaining them will become more apparent and the invention itself will best be understood by reference to the following description of embodiments of the invention taken in conjunction with the accompanying drawings wherein.

FIGURES 4(*a*)–4(*f*) show modifications in the feedback loop, of the basic embodiment.

Figure 5:
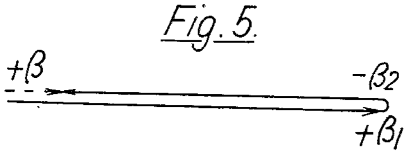

FIGURE 5 shows a diagram for illustrating the principle of the differential positive feedback operation of FIGURE 4(*a*).

Figure 6:
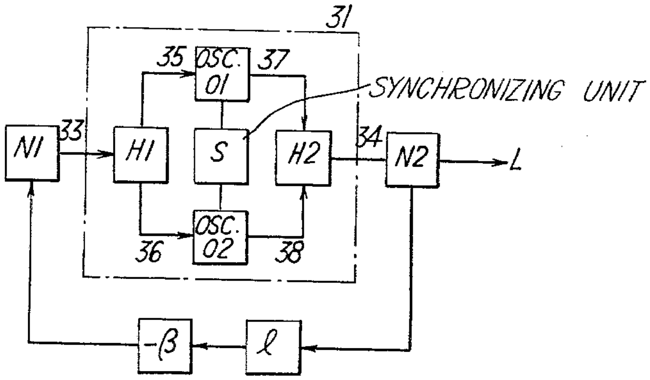

FIGURE 6 shows an alternative basic embodiment with the amplification paths being replaced by oscillators.

Figure 7A:
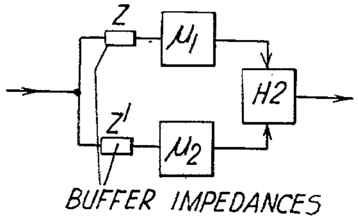
Figure 7B:
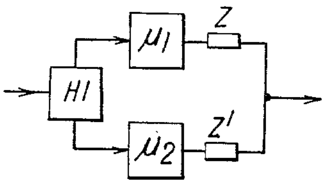

FIGURES 7(*a*) and 7(*b*) each show an arrangement wherein a hybrid circuit is eliminated.

Figure 8A:
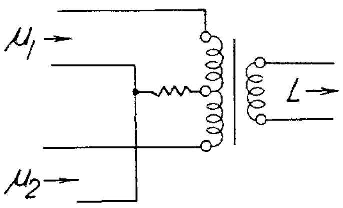
Figure 8B:
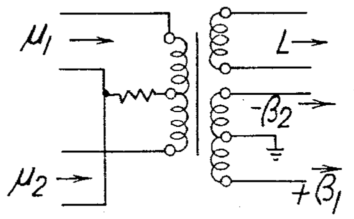
Figure 9A:
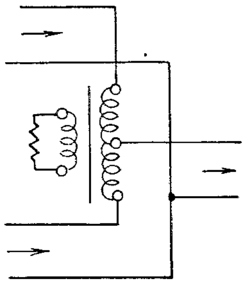
Figure 9B:
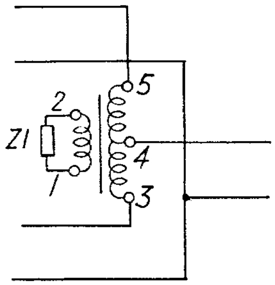
Figure 9C:
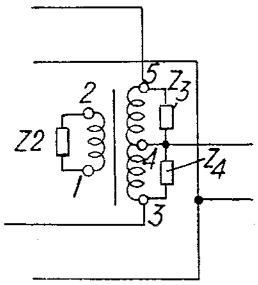
Figure 9D:
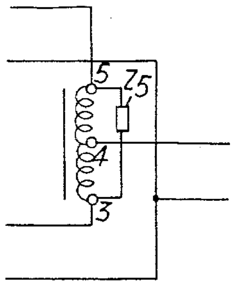

FIGURES 8(*a*) and 8(*b*) illustrate examples of the first type of output hybrid circuit, employing transformers.

FIGURES 9(*a*)–9(*d*) illustrate examples of the second type of output hybrid circuit, employing transformers.

Figure 10:
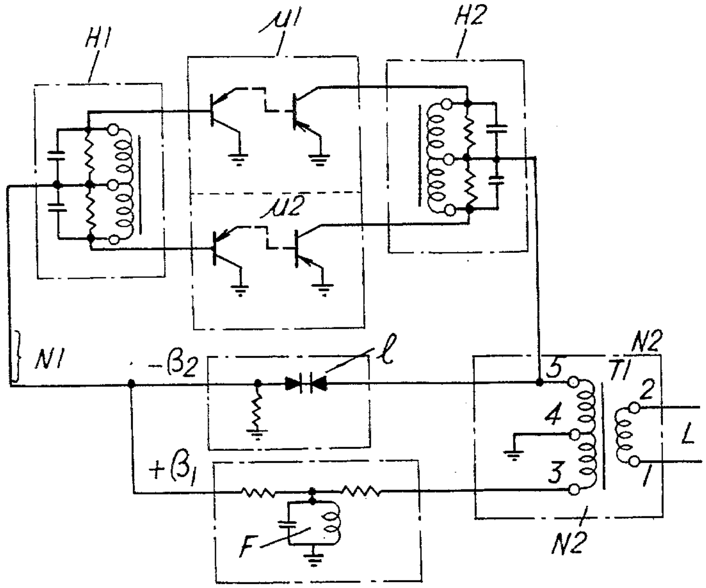

FIGURE 10 illustrates in greater detail the embodiment of FIGURE 4(*d*).

Figure 11:
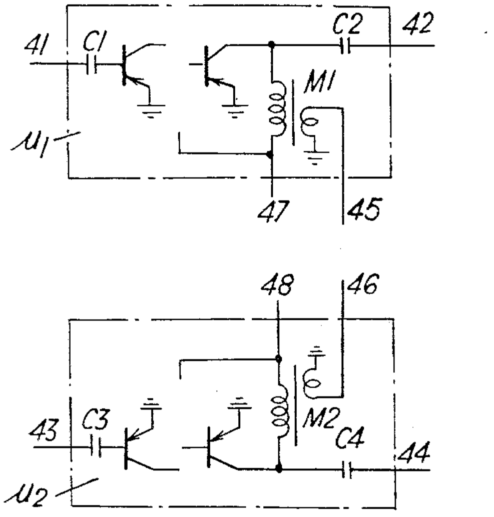

FIGURE 11 shows a modified construction of the amplifying paths to allow supervision.

Figure 12:
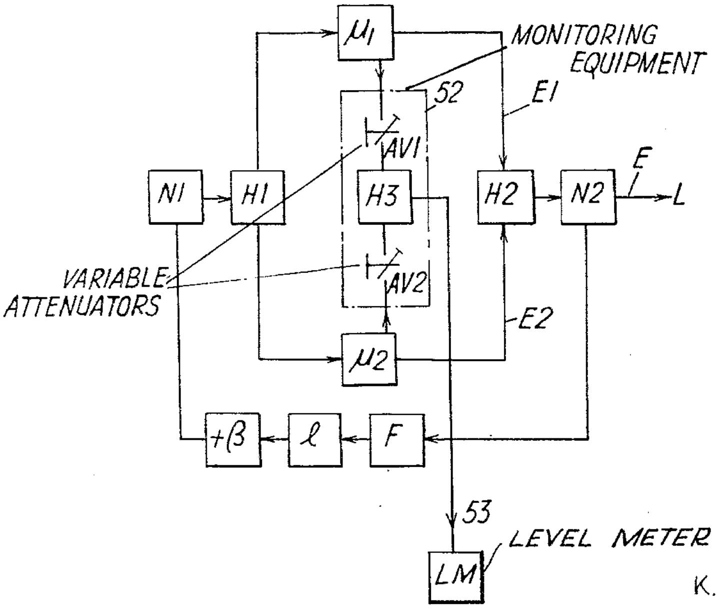

FIGURE 12 illustrates a more sophisticated supervision system.

Figure 1:
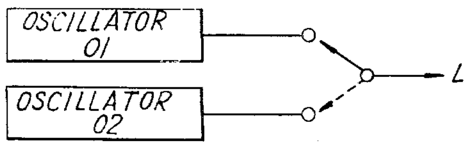
Fig. 1. (PRIOR ART)
FIGURES 1 and 2 illustrate conventional continuity type current supply equipment.
Figure 2:
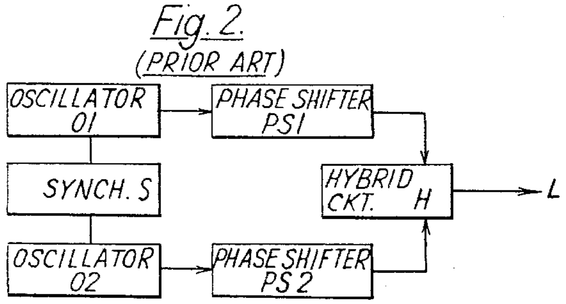
Fig. 2. (PRIOR ART)
Figure 3:
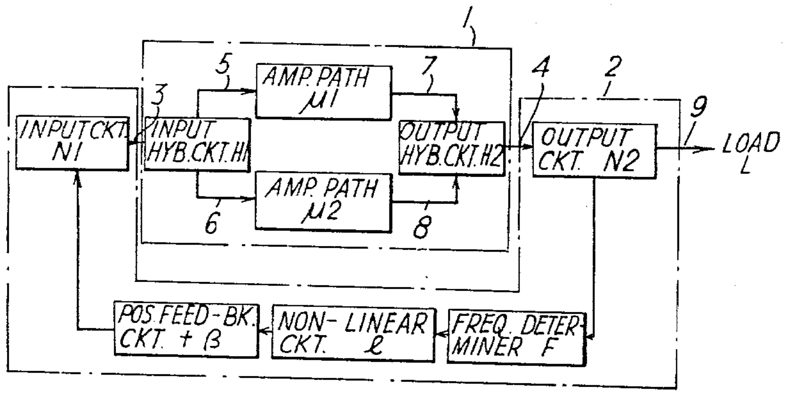
FIGURE 3 shows a basic embodiment of the invention.
Figure 4A:
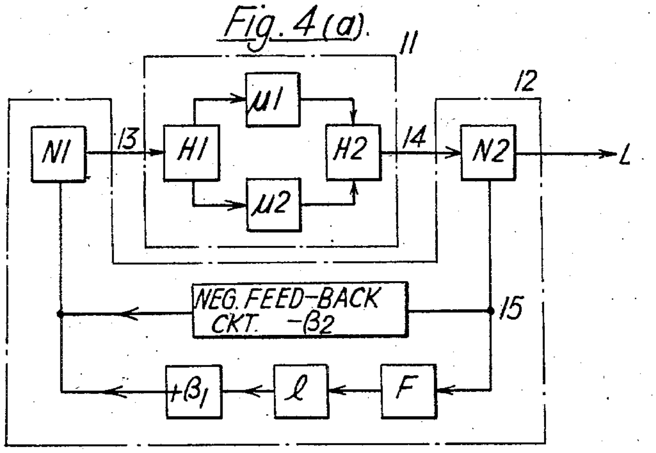
Figure 4B:
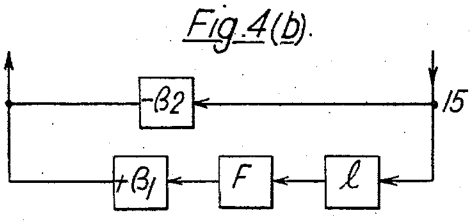
Figure 4C:
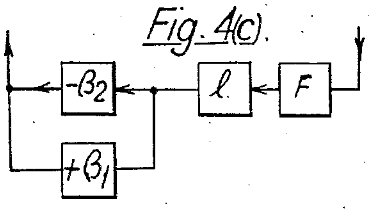
Figure 4D:
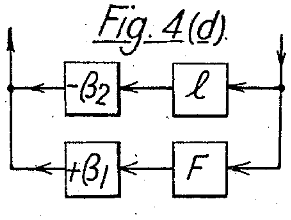
Figure 4E:
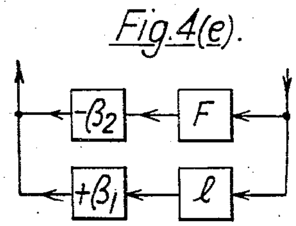
Figure 4F:
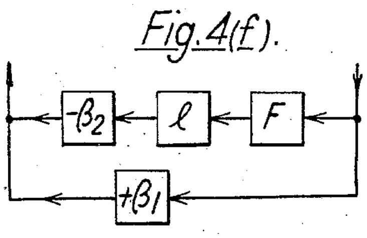

The most important part of a current supply equipment is the so-called oscillator. Although the construction of the oscillator is available in several types, it may be broadly classified into two categories: One the internal feedback (two-terminal) oscillator and the other the external feedback (four-terminal) oscillator (see for example Communication Engineer's Handbook, Maruzen Book Co., Tokyo, Japan, 1957, pages 649–650). FIGURE 3 shows an embodiment of the oscillator belonging to the latter type. In the figure, $\mu_1$ and $\mu_2$ are forward-transmission amplification paths, each having the same or approximately the same characteristics, for constituting the oscillator; $H_2$ denotes an output side hybrid circuit for combining the output of the forward-transmission paths $\mu_1$ and $\mu_2$ in such a manner that the mutual interference between these paths is reduced to a minimum; $N_2$ an output circuit for combining the currents coming from $\mu_1$ and $\mu_2$ and for distributing them between load L and the positive feedback loop (F, *l*, and $+\beta$); F the frequency determining circuit for the oscillator; *l* an non-linear circuit provided with a sufficient operating range for the expected conditions of $\mu_1$ and $\mu_2$, and with the amplitude limiting action for the oscillator; $N_1$ an input circuit; and $H_1$ denotes an input side hybrid circuit for minimizing the mutual interference between the paths $\mu_1$ and $\mu_2$. What is meant by the phrase "minimizing the mutual interference" is that by making the attenuation in the directions $\mu_1$—$H_1$—$\mu_2$ and $\mu_1$—$H_2$—$\mu_2$ large, at the input and output hybrid circuits, the transmission function of each of the forward amplifying paths is substantially independent of the condition of the other (a description of these hybrid circuits will be made later).

The symbol $+\beta$ in the drawings denotes positive feedback. Although $+\beta$ is for convenience represented as a separate block (as if it were in cascade with F and *l*) it should be understood that the positive feedback denoted by $+\beta$ in fact, is merely indicative of a function of the positive loop as an entirety (which comprises F and *l* and if necessary, portions of $N_1$ and $N_2$). Therefore, $\beta$ in the drawings should be understood to represent the characteristic of the feedback loop as a whole rather than positional significance. (A similar meaning should be given to the symbol $\beta$ throughout the specification and drawings regardless of the sign or the sub-numeral associated therewith.)

The non-linear circuit *l* in this case operates in such a manner that the transmission loss in the positive feedback loop increases when the input is larger than the prescribed input level whereas it decreases when the input is smaller than the prescribed input level.

The current flow directions are as indicated in FIGURE 3. Now, for convenience, let: $+\beta$ be the transfer function of the positive feedback loop determined by the circuits F, l, and $+\beta$; $\mu_1$ and $\mu_2$ be the transfer functions of the forward amplification paths $\mu_1$ and $\mu_2$, respectively; and $k$ be a constant determined by the circuits $H_2$, $N_2$, $N_1$, and $H_1$. The operation range of $l$ with respect to $+\beta$ should then be selected so as to be wider than $\beta-\beta'$ where $\beta$ and $\beta'$ satisfy the following relations:

$l=k(\mu_1+\mu_2)\beta$ (Double forward path oscillation condition) (1)

$\mu_1 \approx \mu_2$ $l=k\mu_1\beta'$ (Single forward path oscillation condition) (2)

This selection is easily achieved by suitably selecting the values of $\mu_1$, $\mu_2$, and $\beta$ and adopting a non-linear circuit $l$ having a response range in excess of 6 db. The purpose of the non-linear circuit $l$ is for maintaining the output current constant by varying the positive transfer function $+\beta$ with the magnitude of the output current (as is well known).

FIGURE 3 constitutes an oscillator comprising an amplifying unit 1 and a positive feedback unit 2, whose oscillation frequency is determined by F. If the relations expressed by equations (1) and (2) are satisfied, the oscillator can initiate either double forward path or single forward path oscillation.

It is generally considered that the amplifying unit, or the active circuit unit of a general oscillator, is the prime source of trouble and instability, requiring routine maintenance service and supervision (as will be evident from the construction of an oscillator). From FIGURE 3, it may be seen that no matter which path $\mu_1$ or $\mu_2$ malfunctions, the signal amplification facilities of the amplifying unit 1 is unimpaired and in no case is the gain lowered in excess of about 6 db. Since in this oscillator the circuit $l$, in the feedback loop, operates automatically to compensate for changes in gain of the amplifying unit 1 and increase the transfer function $+\beta$ by an amount equal to lowering in gain of said amplifying unit, oscillations can be sustained. Should the non-linear circuit $l$ be designed to be of the instantaneous response type, and its response characteristics maintained favorably, no substantial changes in the output level or phase will take place. Thus high stabilization of the oscillation frequency becomes possible. (It has been known that to highly stabilize the oscillation frequency, changes in phase-shift characteristics of both the amplifying and feedback units must be minimized.) Thus an oscillator whose construction is as shown in FIGURE 3 provides a continuity type current supply equipment of outstanding characteristics.

According to the invention, the non-linear circuit $l$ must be inserted in a suitable position other than the amplification paths $\mu_1$ and $\mu_2$. It will be understood here that this non-linear circuit $l$ is by no means restricted to one of instantaneous response type; it may be a non-linear circuit whose response characteristics are provided with a time constant of a predetermined amount. Although in the latter case, interruption of the oscillations to a certain extent is inevitable (in accordance with the time constant of $l$), the equipment operates thereafter substantially the same as that which uses a circuit $l$ of the instantaneous response type. If, however, the lowering in gain of $\mu_1$ or $\mu_2$ takes place at a speed slower than the response speed of $l$ (as is normally the case) the equipment operates substantially the same as if a non-linear circuit of the instantaneous response type were used.

FIGURE 4($a$) shows another embodiment of this invention. In this figure, it is to be understood that all circuits but the negative feedback loop representing the function $-\beta_2$ are of the same construction and function as those of FIGURE 3 similarly denoted. For ease of explanation, it will be assumed that the transfer functions $+\beta_1$ and $-\beta_2$ are determined by the positive feedback loop consisting of F, $l$, and $+\beta_1$ and negative feedback loop $-\beta_2$ respectively; and that the two feedback loops are designed to give a resultant transfer function which is positive, at least at the oscillation frequency, and is expressed by the following equation:

$$+\beta=(\beta_1-\beta_2) \quad (3)$$

Further let $\mu_1$, $\mu_2$, and $\beta$ be designed so as to meet the relations shown in Equations 1 and 2. Then this current supply equipment operates as an oscillator having an amplifying unit 11 and a differential positive feedback unit 12.

FIGURE 5 illustrates a vector diagram for the relations of $+\beta_1$, $-\beta_2$, and $+\beta$ at the oscillation frequency. Although in this case $+\beta_1$ and $-\beta_2$ are respectively, completely positive feedback (the feedback voltage is applied in phase with the signal at 13) and completely negative feedback (the feedback voltage is applied in opposite phase to $+\beta_1$); $+\beta_1$ and $-\beta_2$ which should be superimposed are shifted with respect to one another for clarity. As shown in FIGURE 5:

$$|\beta_1-\beta_2| \ll |-\beta_2| \text{ or } |+\beta_1| \quad (4)$$

Although there is no difference, as compared with the embodiment of FIGURE 3, in the fact that lowering in gain of the amplifying unit is about 6 db at maximum, regardless of a malfunction in either path $\mu_1$ or $\mu_2$, the present embodiment will have additional advantages, as will be mentioned below, due to the adoption of the differential feedback system.

When $l$ has begun to function in accordance with the lowering in the signal level at 14 to cause $+\beta_1$ to increase in the mean time by $\Delta\beta_1$, let it be assumed that the overall positive feedback ratio $\beta$ has varied by $\Delta\beta$. Then the following equation will be established:

$$d\beta/\beta \approx [\beta_1/(\beta_1-\beta_2)].(d\beta_1/\beta_1) \quad (5)$$

Then, from Equations 4 and 5, it will be evident that despite small chainges in $\beta_1$, $\beta$ undergoes an effective expansion and changes markedly from its initial value. Therefore the present equipment displays a powerful restoration ability by compressing automatically the level change at 14 by the effective expansion operation due to the above-mentioned differential feedback. This occurs even where $l$ operates but a small amount, and is not instantaneously responsive to the gain variation of 11; with the result that the operation range of $l$ may be extremely small and further, the response speed of $l$ may be small. Thus the selection of the type of $l$ circuit becomes extremely easy. Provided the response speed of $l$ is the same as in case of FIGURE 3, the instantaneous interruption time interval of FIGURE 4($a$) becomes much shorter than the instantaneous output time interval due to rapid lowering in gain that may occur in $\mu_1$ or $\mu_2$, with the result that a current supply equipment of better characteristics than FIGURE 3 is available.

FIGURES 4($b$) through 4($f$) illustrate several embodiments wherein the feedback unit of FIGURE 4($a$) is modified. As noted previously, in connection with FIGS. 3 and 4($a$), the $\beta$ symbols, such as $+\beta_1$, $-\beta_2$ etc., denote the function (positive or negative feedback) of the feedback loop in which the symbol appears and do not represent a positional element. The non-linear circuit $l$ and the frequency determining circuit F may be inserted in any suitable place other than the amplification paths $\mu_1$ and $\mu_2$. Where it is involved in the positive feedback (or the overall positive feedback) loop, the circuit $l$ will operate with such polarity that the transmission loss of the positive feedback loop may be increased when the incoming input is larger than the prescribed input level, while it may be decreased when the incoming input is smaller than the prescribed input level. Conversely, when the non-linear circuit $l$ is involved in the negative feedback loop as in FIGURES 4($d$) and ($f$), it operates with such polarity that the transmission loss of the negative feedback loop may be decreased with respect to an input larger than the prescribed input level, while it may be increased with respect to an input smaller than the prescribed input level. In either case, $l$ should be provided with the non-linearity between the amount of changes in input level and that in transfer function, depending on use. Various kinds of circuit elements such as diodes, constant-voltage diodes, thermistors, ballast tubes, or the like may be used for the non-linear circuit $l$. These circuit elements may be operated in a number of ways. For example the elements may be directly driven by the output power of this current supply equipment; or a part of the output may be suitably derived, amplified, rectified, and then the necessary rectified output compared with a standard direct current to perform the expansion of level variations.

The frequency determining circuit F may have the form of a parallel LC circuit shown in FIGURE 10 (to be discussed hereinafter).

In designing a current supply equipment according to the present invention, the non-interruption facilities can be best displayed by adopting a non-linear circuit $l$ of the instantaneous response type, or one with the smallest time constant $\tau_l$ (a measure of the transient response time). On the other hand, where the Q (frequency selectivity) of the frequency determining circuit F is extremely high and hence, the damped free oscillations persist, it is unavoidable that F itself has a time constant $\tau_F$. Therefore, $\tau_l<\tau_F$ is a desirable condition. Needless to say $\tau_\mu<\tau_l$ is also a desirable condition for the circuits contained in the amplification path. It is desirable, however, that the speed of lowering in gain of either amplification route, due to deterioration in characteristics, be smaller than the response speed of F or $l$ which is determined by $\tau_F$ and $\tau_l$.

As to the insertion position of $l$ and F in the current supply equipment, the following arrangements can be made:

For simplicity of description and ease in understanding, let it be assumed that all of the circuits but F are designed to be of the instantaneous response type. The circuit of FIGURE 4(*b*) has substantially the same performance as that of FIGURE 4(*a*), although the insertion position of $l$ and F are opposite. In reducing the circuits of FIGURE 4(*a*) and (*b*) to practice, the response range to be provided for $l$ in FIGURE 4(*a*) may be narrower than that for FIGURE 4(*b*). This can be demonstrated by the following: referring to the current supply equipment of FIGURE 4(*a*), the gain of the amplifying unit 11 varies about 6 db when mounting or removing the amplification route $\mu_2$ to or from the equipment. Even in this case the output level before or after the transient state varies only 6 db and is given by the following equation:

$$\Delta\ \text{db}=\frac{6}{a\delta}\ \text{db} \tag{6}$$

where a: expansion factor of $l$ $\delta$: expansion factor of the expansion operation due to the differential feedback which depends upon $B_1/(B_1-B_2)$ in Equation (5).

and $a\delta>>6$

Therefore the output level can be designed so as to remain virtually unchanged. The signal applied to point 15 in FIGURE 4(*a*) or (*b*) is of such kind as will return to the initial value after an instantaneous change. It will be evident, therefore, that the range of the changes in level applied to $l$ is narrower for the case in which the changes are slowed down through the circuit F (FIGURE 4(*a*)) than for the case in which the level changes are directly applied to $l$ (FIGURE 4(*b*)). This tendency will be more pronounced, the higher the Q of F. Let the time constant for characterizing the transient state of the equipment output level be $\tau$. Then $\tau$ is approximately given by the following equation under the above-mentioned assumptions:

$$\tau \doteqdot \tau_F/a\delta \tag{7}$$

Therefore, unless a sufficiently large magnitude of $a$ is maintained over the response range of 6 *db* of $l$ in the case of FIGURE 4(*b*), it can scarcely be expected to have a similar transient characteristic to the arrangement of FIGURE 4(*a*). Sometimes $a$ may be lowered for large variations in level. In such a case, the duration of the transient phenomenon of FIGURE 4(*b*) becomes longer than that of FIGURE 4(*a*), which is disadvantageous from the viewpoint of level stabilization. Therefore it is advantageous to design $l$ to have a narrow response range and a short transient time and to insert it after F (as shown in FIGURE 4(*a*)) with respect to the direction of signal transmission. In general, it might be said that it is desirable to insert F between the two amplification paths (output side) and $l$.

FIGURE 4(*c*) illustrates an example of the construction in which both $l$ and F are inserted in the overall feedback loop, with the result that it will have exactly the same function and effect as that of FIGURE 3. From the fact that the construction of FIGURE 4(*c*) does not perform differential feedback and hence, $\delta=1$ in Equations (6) and (7), it is evident that the differential feedback type is more advantageous in displaying the non-interruption properties compared to the single positive feedback loop type such as shown in FIGURE 3 and FIGURE 4(*c*).

FIGURES 4(*d*), 4(*e*), and 4(*f*) illustrate other constructional examples of the differential positive feedback loop. Although the construction of FIGURE 4(*e*) operates on the same principle as that of FIGURE 4(*a*), the construction of both FIGURES 4(*d*) and (*f*) provide an effective expansion operation (due to differential feedback), by changing first the magnitude of $-\beta_2$ upon a malfunction in $\mu_1$ or $\mu_2$, and then the over-all positive feedback ratio $+\beta$ to a large extent so as to maintain the output of the equipment substantially constant. Of these, the arrangement in FIGURE 4(*d*) has better transient characteristics than that of FIGURE 4(*a*) whenever the time constant $\tau_F$ of F becomes a problem that cannot be disregarded. In the case of FIGURE 4(*a*), event if all circuits but F are of instantaneous response type, the output level will have to be provided with the time constant of Equation (7) for the restoration of the equipment output level when mounting or removing $\mu_1$ or $\mu_2$. The construction of FIGURE 4(*d*), with F provided with a time constant, signifies that $\delta$ becomes much larger than $\beta_1/(\beta_1-\beta_2)$; the restoration ability of the equipment output level being reinforced the more the value of $\delta$ exceeds $\beta_1/(\beta_1-\beta_2)$. Therefore more perfect noninterruption characteristics than those of FIG. 4(*a*) are available.

Where the time constant of F becomes a problem, it is desirable that F be inserted in the positive feedback loop as shown in FIG. 4(*a*) or (*b*).

Hence it may be seen that by combining the features of FIG. 3 and those of FIG. 4(*a*) through (*f*), showing the differential feedback type, and properly determining the time constants of the various parts with respect to their position in the various circuits (with the help of the disclosed equations) it is possible to obtain a current supply equipment which can fulfill the requisites of continuous and stable operation.

FIG. 6 utilizes the same principle as the embodiments of FIGS. 3 and 4(*d*), the difference being that the amplification paths $\mu_1$ and $\mu_2$ (or the active circuits of FIG. 3 or 4(*d*)), are replaced with the oscillators $O_1$ and $O_2$. The two oscillators $O_1$ and $O_2$ which are maintained in synchronism by an internal synchronizing unit S interposed between $O_1$ and $O_2$ (or by a dependent synchronizing unit disposed outside the present current supply equipment) will have a sufficiently powerful oscillation capacity, to enable the respective active circuits to be saturated. The inputs and outputs to $O_1$ and $O_2$ are split and combined by the hybrid circuits $H_1$ and $H_2$, respectively. Between these hybrid circuits is connected a negative feedback loop including a non-linear circuit $l$ provided with a response range for compressing the equipment output to a prescribed level (whether one or both oscillators in the oscillator section (31) are operational); whereby the output level can be maintained constant in any anticipated condition of $O_1$ and $O_2$. Whether both oscillators $O_1$ and $O_2$ are of internal feedback type or of the external feedback type, the entire equipment will operate as a stabilized oscillator in the same way as the circuit of FIG. 4(*d*), that is, by the differential feedback action between the positive feedback inherent in each of $O_1$ and $O_2$ and the negative feedback $-\beta$ of the oscillator unit 31. Provided the negative feedback loop consisting of $l$ and $-\beta$ has a response range in excess of 6 db, oscillations can be sustained no matter which oscillator malfunctions, and the output level and phase maintained extremely stable.

The arrangement shown in FIGS. 3, 4(*a*) through (*f*) and 6 are in block form to clearly delineate the functions of the hybrid circuits, input and output circuits, feedback loop, the non-linear circuit, and the frequency determining circuit. Thus, such arrangements may, at first glance, appear complex as compared to conventional equipment. In reducing the present invention to practice, however, several of the circuits consist of only one element while others may be lumped or deleted (as will become apparent when FIGS. 9 and 10 are discussed).

One of the constructional features of this invention is the provision of two or more amplification paths (or oscillators) in the amplifying (or oscillator) unit which is provided with feedback from the output side of the amplifying (or oscillator) unit to the input side, these paths (or oscillators) being connected so as to minimize the mutual interference. It will be evident that the scope of the present invention is by no means restricted to the various embodiments which have been cited for description. If the inserting positions of the non-linear circuit $l$ or the frequency determining circuit F are taken as an example, various embodiments are available by changing the inserting positions or the order of insertion. Various circuit types are also conceivable for the hybrid circuits, as will be mentioned afterwards; and the hybrid circuit can be dispensed with by using suitable buffer impedances Z and Z′ as shown in FIGS. 7(*a*) and 7(*b*). Further, the number of the amplification paths or oscillators is by no means restricted to two.

A description will now be made of the several types of hybrid circuits which are capable of meeting the needs of the current supply equipment according to the subject invention.

For the hybrid circuit of FIG. 3, the type shown in FIG. 8(*a*), is conceivable. With this hybrid circuit, signals substantially in opposite phase are transmitted over paths $\mu_1$ and $\mu_2$ and are combined in phase to become the equipment output. This type of hybrid circuit will be referred to hereafter as the hybrid circuit of the first kind.

Suppose that the output side hybrid circuit $H_2$ in FIGURE 4(*a*) or FIGURE 10 is composed of the first kind hybrid circuit. Such a composition is advantageous in that the function of $H_2$ and $N_2$ can be realized by a single transformer as illustrated in FIGURE 8(*b*). In this case, however, the electromagnetic coupling between the transformer windings only provides transmission from $\mu_1$ and $\mu_2$ to $+\beta_1$, $-\beta_2$, and L. Therefore the first kind hybrid circuit has such defects that the phase characteristics and the feedback loop stability are effected by the main or leakage inductances of the transformer; with the result that the operating frequency band tends to become narrow, and the high frequency stability can not be expected.

The hybrid circuits as will be mentioned below are applicable to the current supply equipment according to this invention. All of the examples, of the output side hybrid circuit types, shown in FIGURE 9(*a*) through (*d*) intend to combine two signals traveling over the amplification paths $\mu_1$ and $\mu_2$ in phase. The hybrid circuit of this type will be referred to as the hybrid circuit of the second kind. Both of the circuits FIGURE 9(*a*) and (*b*) are prototypes of the second kind hybrid circuit. With this construction, transmission signals from $\mu_1$ and $\mu_2$ to the load by no means depend solely on electromagnetic coupling between transformer windings, and the defects inherent in the first kind of hybrid circuit can be lessened to a large extent by using the second kind.

Further, the second kind hybrid circuit may be constructed in several ways as shown in FIGURE 9(*c*) and (*d*) and FIGURE 10. The value of the resistance shown in FIG. 8(*a*) is determined in connection with the values of the turns ratio of the windings of the hybrid circuit, the output resistance of both forward paths $\mu_1$ and $\mu_2$ or two signal source resistances for the hybrid circuit, and the resistance of the load L. Such determination makes it possible to nullify the mutual interference between both forward transmission paths $\mu_1$ and $\mu_2$. Therefore, such resistances are usually called balancing resistances. In other words, the resistance value for the balancing resistance is selected such that the transfer function from forward path $\mu_1$ to the load L is always constant regardless of presence of forward path $\mu_2$ and of the output impedance of path $\mu_2$. Inasmuch as the same holds also for the transfer function from the forward path $\mu_2$ to the load L, each of said paths $\mu_1$ and $\mu_2$ can transmit the individual output to the load L independent of the other output and without any interference between them.

When the second type hybrid circuit shown in FIG. 9(*a*) is used, the resistance illustrated therein serves exactly the same purpose as that shown in FIG. 8(*a*). If the source impedance for the hybrid circuit and the load impedance are not purely resistive, then the circuit of FIG. 9(*a*), will not achieve the desired object. Therefore, the circuit FIG. 9(*a*) must be replaced with an impedance $Z_1$ illustrated in FIG. 9(*b*) or with a network serving as the balancing impedance, to minimize the mutual intereference between the forward transmission paths $\mu_1$ and $\mu_2$.

FIGURE 9(*c*) shows a case in which the balancing network $Z_1$ in FIGURE 9(*b*) is divided into $Z_2$, $Z_3$, and $Z_4$ in such a manner that $Z_1$ becomes electrically equivalent to the total of $Z_2$, $Z_3$, and $Z_4$. FIGURE 9(*d*) shows a case in which the winding 1–2 is deleted and $Z_5$ which is electrically equivalent with $Z_1$ in FIGURE 9(*b*) is used. With the $H_2$ in FIGURE 10, $Z_2$ in FIGURE 9(*c*) is included in both $Z_3$ and $Z_4$, and winding 1–2 is abolished with both $Z_3$ and $Z_4$ being constructed by using a resistor and a capacitor. The hybrid coil shown in FIGURE 9(*d*) or by $H_2$ in FIGURE 10 may be a simple two-winding transformer with a winding ratio of 1:1 thus enabling the manufacture of a transformer adapted for a wide frequency range to be possible. The hybrid circuit shown in FIGURE 9(*c*) and by $H_2$ in FIGURE 10 can provide a stable negative feedback as applied to the differential feedback type current supply equipments of FIGURE 4(*a*) through (*f*). Such types of hybrid circuits have the outstanding feature of effectively suppressing parasitic oscillations which might otherwise occur on account of negative feedback at super-low or super-high frequencies.

FIGURE 10 is an example wherein hybrid circuits of the second kind, favorable for reduction of the present invention to practice, are connected to both sides of the amplification paths. FIGURE 10 is as previously mentioned, an embodiment equivalent to FIGURE 4(*d*) in which each of the amplification paths $\mu_1$ and $\mu_2$ is represented as consisting of a grounded-collector transistor and a grounded-emitter transistor connected in cascade. $N_2$ consists merely of transformer $T_1$; the output current to a load L, the negative feedback current, and the positive feedback current being respectively available from terminals 1–2, 4–5, and 4–3. In this embodiment, the non-linear circuit $l$ and the supply current frequency determining circuit F are respectively provided in a negative feedback loop $-\beta_2$ and a positive feedback loop $+\beta_1$.

All of the input circuits $N_1$ in FIGURES 3, 4(*a*) through (*f*), and 6 are represented in schematic block form for convenience of illustration. $N_1$ in FIGURE 10 is indicative only of the actual position in the circuit, however, as may be seen no special components are required. The non-linear circuit in the present embodiment consists of the non-linear impedance of two constant-voltage diodes. It operates in such a manner that as the output level of this equipment becomes larger than the prescribed value the impedance of these diodes falls off rapidly so as to make the transmission loss of the negative feedback loop and also the equipment output level small. Conversely, as the equipment output becomes smaller than the prescribed value the impedance of these diodes becomes rapidly large so as to increase the transmission loss of the negative feedback loop and likewise increase the equipment output level. Needless to say, the tuning circuit consisting of a condenser and a coil, as shown by F in the figure, makes the total feedback positive at their parallel tuning frequency and determines the supply current frequency of the present equipment. It will be understood that the algebraic sum of negative feedback $-\beta_2$ and positive feedback $+\beta_1$ provides the differential positive feedback for $N_1$ with respect to the aforementioned frequency. This equipment operates, as a whole, as a current supply equipment with excellent characteristics as has been described previously with reference to FIGURE 4(*d*).

In reducing the continuously operable current supply equipment, according to the invention, to practice, means for supervising the operation of the amplification paths or oscillators affords a critical problem.

As one of the principal features of this invention it is presupposed that at least two of the plurality of amplifications paths or oscillators contained in the current supply equipment are operated simultaneously so that despite a malfunction in any one or more paths the remaining paths can maintain the function of the equipment. Therefore any malfunction must be ascertained quickly by maintenance personnel so that the faulty equipment can be replaced. If this is not done additional malfunctions may accumulate resulting in a complete or partial failure of the equipment.

For this reason, it is desirable that while each amplification path or oscillator is operating normally at the prescribed position:

(a) supervision of the amplification paths or oscillators be made at regular intervals to detect deterioration in operating characteristics at its incipient stage; and (b) should either amplification path or oscillator become defective, maintenance personnel be informed of the occurrence of trouble without delay by some means such as, for example, an automatic alarm.

Since it is the object of the invention to stabilize the output level, it is extremely difficult to detect the deterioration in the operating characteristics of any one path unless it develops into a serious trouble.

An arrangement which provides the desirable solution, while at the same time obviating the above difficulty, is disclosed in our copending application number 187,657 (K. Ishimoto-K. Nakamura 8–3) filed April 16, 1962. This arrangement will be briefly described below to show its adaptability to current supply equipment of the type described in the instant invention.

Let FIGURE 3 be taken as an example and the voltages (or currents) at various points considered. Let the oscillation voltage at position 3 be expressed by $e_1$. Then the output oscillation voltages $E_1$ and $E_2$ of $\mu_1$ and $\mu_2$ at points 7 and 8, and the output voltage E at terminal 9 are expressed by the following equations:

$$E_1=k_1\mu_1e_1$$
$$E_2=k_1\mu_2e_1 \qquad (8)$$
$$E=k_0(E_1+E_2)=k_1k_0\mu e_1$$

where $\mu_1$ and $\mu_2$ denote respectively, the gains of the forward transmission paths $\mu_1$ and $\mu_2$ and $\mu$ denotes $\mu_1+\mu_2$ and $k_1$ and $k_0$ are constants determined by the circuit $H_1$ and $N_1$ and the circuits $H_2$ and $N_2$.

The following relations can be obtained from the set of Equations (8):

$$E_1/E=\mu_1/[k_0(\mu_1+\mu_2)]$$
$$E_2/E=\mu_2/[k_0(\mu_1+\mu_2)] \qquad (9)$$
$$E_1/E_2=\mu_1/\mu_2$$

Any of these ratios will be unaffected by the transfer function of the feedback loop in this current supply equipment, but will be affected by variations in both $\mu_1$ and $\mu_2$. Variations in the ratio $E_1/E_2$ will be directly affected by changes in the gain ratio between $\mu_1$ and $\mu_2$. Since the hybrid circuit $H_2$ has a large amount of attentuation in the direction $\mu_1$–$H_2$–$\mu_2$, and the oscillation voltages at the points 7 and 8 consist of the output voltages of the paths $\mu_1$ and $\mu_2$ respectively, each of $E_1$, $E_2$, and E can be easily measured. Thus the relations expressed by Equations (9) are quite advantageous in supervising the operation of each amplification path in the current supply equipment in normal operation; and changes in gain of each path $\mu_1$ or $\mu_2$, (which is in general the best index for the deterioration in operating characteristics of each path), can be promptly detected by monitoring any of the ratios $E_1/E$, $E_2/E$, and $E_1/E_2$ or their reciprocals. The supervision of such functions has an inherent advantage in that if a short circuit is incurred in the output section of either path, by some mistake in supervising $E_1$ for example, the current supply facilities are not impaired because of the previously mentioned principles of preventing signal interruption.

FIGURE 11 illustrates the construction of a circuit for offering a supervising means for the current supply equipment according to this invention. Points 41 and 43 and points 42 and 44, respectively, correspond to points 5, 6, and 7, 8 in FIGURE 3.

In FIGURE 11 each forward transmission path is so composed, that only the signals are transmitted, while the direct currents are blocked by condensers $C_1$, $C_2$, $C_3$, and $C_4$. This prevents a D.C. trouble occurring in one forward amplifying path from causing a chain of malfunctions in the other forward amplifying path, hybrid circuits, input and output circuits, or feedback circuit. Inasmuch as the current supply device herein disclosed is primarily designed so that if either forward amplifying path malfunctions it may be replaced with a new one, it is advisable for the forward amplifying paths $\mu_1$ and $\mu_2$ to be mounted separately. It is, therefore, also preferable that the direct current circuits necessary for the operation of the active elements (in this case transistors) contained in the forward amplifying paths be separated from the input and output circuits as well as the hybrid circuits. According to the example of FIGURE 11, the two D.C. circuits are blocked by $C_1$, $C_2$, $M_1$, and $C_3$, $C_4$, $M_2$ respectively and the D.C. currents necessary for the forward transmission paths are furnished from terminals 47 and 48. A secondary winding is provided for each of choke coils $M_1$ and $M_2$. The reason for the provision of these secondary windings is as follows: If the output signal voltages are to be supervised at the points 42 and 44 the supervision is subject to the restriction that the input impedance of the supervisory measuring instrument must be large. However, if low-impedance secondary windings are provided to facilitate the use of a low-impedance measuring instrument, the equipment can be supervised from terminals 45 and 46. These secondary windings are also effective in blocking direct current that would otherwise flow into the measuring instrument.

FIGURE 12 shows the embodiment of FIGURE 11 in a more sophisticated arrangement in conjunction with the embodiment of FIGURE 3.

$AV_1$ and $AV_2$ in 52 are variable attenuators each having a dial provided with suitable marked db graduations, while $H_3$ is a hybrid circuit constructed so as to introduce a large attenuation in the direction $AV_1$–$H_3$–$AV_2$. Inasmuch as the output voltages $E_1$ and $E_2$ are so combined, if such voltages are approximately in phase or in opposite phase with each other, across specific terminals of the hybrid circuit, so as to cancel each other out, connection of those terminals to a point 53 and the point 53 to a level meter LM having suitable sensitivity, will make the level meter LM indicate a minimum value when the variable attenuators $AV_1$ and $AV_2$ are suitably adjusted. Since this signifies that the gain of the forward amplifying path having a lesser amount of attenuation in the variable attenuator is smaller than the gain of the other forward amplifying path, by the difference between readings of the two variable attenuators, the monitoring object can be attained. Although it is possible by such means to monitor, as will be understood from Equation (9), all of the ratios $E_1/E$, $E_2/E$, and $E_1/E_2$ or the reciprocals thereof, the monitoring of $E_1/E_2$ only, is sufficient for practical use.

The operation supervisory means has been described above in connection with FIGURE 3, but it goes without saying that the supervisory means works in much the same way for the current supply equipment of the construction as shown in FIGURES 4(*a*) through (*f*). For the current supply equipment of FIGURE 6, the relations expressed by Equations (9) are not established and hence, locating the deterioration operating characteristics of $O_1$ and $O_2$ at its incipient stage becames difficult In addition, from the above description of the invention with reference to FIGURE 12, it may be seen that the device is easily adaptable to an automatic alarm when the characteristics vary by a predetermined amount. For example, in the case where the outputs of the monitoring points are obtained 180° out of phase, in the hybrid circuit $H_3$, a null should result at lead 53. Hence a relay may be provided, in parallel to the meter, set to respond to a predetermined value of current (the relay triggering an alarm). The current through the relay will depend not only upon the gain comparison between the forward amplifying paths, but also upon the phase comparison.

Turning now to the maintenance of the equipment: Any amplification path or oscillator which has been found to be defective by the supervision means must be removed from the current supply equipment and replaced with a spare amplification path or oscillator. In mounting or removing such an amplification path or oscillator to or from the normally operating current supply equipment, an appreciable click noise is generally produced. It goes without saying that such is quite disadvantageous to the equipment as well as the load. Hence it is another object of this invention to provide an effective means for suppressing such noise.

Since it is common practice with the current supply equipment according to this invention to replace a faulty amplification path or oscillator with a normal one, it is recommended that each of $\mu_1$, $\mu_2$, or $O_1$, $O_2$ be mounted separately and be of plug-in construction. Referring to the embodiment of FIGURE 3, it may be so designed that no matter which path $\mu_1$ or $\mu_2$ is removed, the input connection part (point 5 or 6) or the output connection part (point 7 or 8) or both are cut off from the equipment or short-circuited (which with plug-ins is easily accomplished) so as to block the transmission and reception facilities for the defective path; and under this condition the D.C. power circuit necessary for the operation of the defective path is then blocked so that the removal from the current supply equipment may occur without an offending click.

Conversely, no matter which path is to be mounted, the transmission and reception facilities of the path are retained for example by short-circuiting or keeping unconnected either or both of the input and output connections until the D.C. power source, necessary for the operation of the replaced path, is first connected. The transmission and reception facilities which have been retained are then released after first insuring the path is operational so that it may be securely mounted in a ready condition.

The current supply equipment provided with means for suppressing such a click noise will produce but an extremely small click as compared with equipment not so provided. This is because of the fact that the principal cause of the production of a click noise is the switching on or off of the path in mounting or removing the D.C. power supply circuit for the oscillator, and the click noise thus produced is led to the current supply equipment via the path or oscillator to be removed.

A detailed description for accomplishing the above is unnecessary in view of the various means available. A simple method of providing the above, for example, is to insure that the plug-in leads to the D.C. supply are longer. Thus the unit will be inserted first and removed last from the means for making it operational.

We have previously considered the stability of the equipment from the view point of its construction, supervision, and click noise suppression. The problem still remains, however, to make the equipment operational notwithstanding a malfunction in the non-linear circuit. This is because, should a trouble occur in the non-linear circuit the output level will change excessively or at times, the current supply facilities will be completely lost. If for example, a thermistor or a ballast tube is used as a component element of the non-linear circuit, in addition to the difficulty inherent in supervision and maintenance, the necessity for suitable preheating of such an element, prior to operational replacement, also exists.

Hence it is still another object of this invention to provide a highly reliable current supply equipment in which these defects have been eliminated to such an extent as to be of no practical hindrance.

According to the invention, a non-linear control element group consisting of a plurality of control elements, which are combined with each other by utilizing their proper characteristics, is used in the non-linear circuit; whereby the effect of a local trouble that would otherwise affect the entire operation of the current supply equipment is suppressed.

As a first example, conceivable according to the conventional system, let us consider a case in which a part of the output is taken by some suitable means, and then amplified and/or rectified as required, and finally compared with a standard voltage or current to perform the expansion of the level variation so that an indirectly-heated thermistor in the non-linear circuit may be heated. In contrast, according to this invention two or more indirectly-heated type thermistors are used as follows:

Both the beads and heaters of the thermistors are connected in parallel from the beginning. Provided each thermistor is designed so as to be easily mounted or removed from the equipment (for instance, by plug-ins) the extent of damage in this case would be appreciably smaller than that for a case in which the non-linear elements are not connected in parallel. When the heater is open-circuited, the bead resistance of the faulty thermistor increases (with a time constant specific to the thermistor) to become ultimately an excessively large value; with the result that the control of the output level is maintained smoothly by the remaining thermistors and the damage incurred becomes slight (including the instant at which the faulty thermistor is removed from the equipment). The fact that the bead resistance of a spare thermistor that has been kept at room temperature is high is extremely advantageous in mounting it in a position from which a faulty thermistor has been removed, since the equipment is not subjected to a rapid change in parameters and the bead may be gradually warmed up. As an alternative only the beads of the thermistors need be connected in parallel with a provision for a switch in each heater circuit (the switches kept normally closed). If each thermistor is so designed as to be easily mounted into or removed from the equipment as indicated above, this setup will have the advantageous capability of removing normal thermistors for preventative maintenance in addition to the previous advantage of the first example. This is because the switch corresponding to the thermistor can be opened and the thermistor can be placed in the same condition as if the heater were open-circuited. In mounting a spare thermistor which has been maintained at room temperature it is only necessary to close the switch after the thermistor has been mounted.

According to a third example, two or more directly-heated thermistors are used in lieu of the indirectly-heated ones as follows:

The thermistors are connected in parallel, the construction of each being so designed as to be easily mounted or removed to or from the equipment. Then, no matter which thermistor deteriorates in characteristics in the direction in which the terminal voltage is increased, or whichever thermistor is open-circuited, the equipment is automatically controlled in such a direction that the normal current supply can be sustained; with the result that the damage incurred by such a malfunction can be reduced to a minimum.

With such an arrangement the directly-heated thermistor section is primarily designed to manifest as low an impedance as possible for the signal level change within a prescribed response signal level range. In other words, the signal source impedance and load impedance for the thermistor unit, even when these thermistors are connected in series and a current is conducted therethrough, are so chosen that the terminal voltage produced across the ends of the total impedance of the thermistor unit is maintained substantially constant within the prescribed response signal level range. Thus, by increasing the expansion factor, or namely the ratio of the signal source E.M.F. level change to the load current level change for the thermistor unit, favorable output level control characteristics are obtained. It will be evident from this that the directly-heated type thermistors intended for this purpose should be used in a range in which a considerably flat voltage response is presented against changes in current. This is also demonstrated by numerous facts. Where a plurality of directly heated type thermistors with such characteristics are connected in parallel and heated, individual thermistor current values differ from one another to a marked extent even if the voltage deviation of the current-voltage characteristics between any two thermistors is extremely small. Thus the terminal voltage of a thermistor group, when these thermistors are connected in parallel and heated, will become close to the voltage characteristics of a thermistor which presents the lowest voltage, the existence of the remaining thermistors becoming insignificant.

Where the principle of this invention is applied to the third example, the aforementioned features of this equipment are fully displayed, provided all of the thermistors conform to the prescribed current-voltage characteristics range. If a bead current supervising means is provided for each thermistor, the particular thermistor governing the equipment characteristics can easily be distinguished and at the same time, whether or not any other thermistor has been open-circuited, can be discriminated. Therefore it is possible to remove a particular thermistor governing the equipment characteristics when the output level of the equipment manifests an abnormal value or tends to manifest an abnormal value, and a difficulty that would otherwise occur can be prevented. Any thermistor which is not governing the equipment characteristics can be removed anytime without substantially affecting the equipment.

As a fourth example, let us consider a case in which thermistors are designed so as to be connected in parallel (for instance, by connecting thermistor sockets in parallel) and one thermistor alone is mounted in the normal operation of the equipment. According to this example, it is intended to operate two thermistors in parallel only when a faulty thermistor is replaced with a spare, in the same manner as the third example. When the characteristics of an operational thermistor has deteriorated and hence, the output level of the equipment tends to manifest an abnormal value, the faulty thermistor can be replaced with a spare thermistor having favorable characteristics without affecting the equipment.

It will be understood that although indirectly-heated or directly-heated thermistors are exemplified as the non-linear elements in describing the parallel operation, non-linear elements are by no means restricted to thermistors; any elements may be used in lieu of thermistors so long as such elements have similar characteristics.

The paralleling of such non-linear elements can be affected as follows:

In using indirectly-heated thermistors (or elements having similar characteristics) both the beads and heaters (or similar parts) are connected in parallel; or are connected in parallel only in the case of replacement; or are individually heated (or driven) to constitute an element group: whereas in using directly-heated thermistors the beads (or similar parts) are always connected in parallel; or are connected in parallel only in the case of replacement; or are individually heated (or driven) to constitute an element group. Further, each element is designed so as to be easily mounted or removed. A current supply equipment of high stability and reliability can thus be provided by mutually utilizing the features of each element.

As will be understood from the foregoing, it is possible to construct a continuously operable current supply equipment having excellent characteristics and high reliability such that the current supply facilities (such as frequency, output level phase, and the like) are substantially unaffected, notwithstanding a malfunction in any path or oscillator. Further, according to the invention, supervising and maintenance means, and an equipment construction for click noise suppression can be incorporated in the overall system. Moreover, by connecting a group of non-linear elements in parallel the reliability of the non-linear circuit may also be improved.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. Current supply equipment of the continuously operable type comprising:

(a) at least two forward transmission paths, each having an input and output terminal and each including separate signal generating means;

(b) first input circuit means connected to said input terminals and second output circuit means connected to said output terminals each of said circuits including a resistor for connecting said paths in parallel with minimum mutual interference;

(c) output current means serially connected to said second output circuit means for providing an output for the current supply equipment;

(d) a positive feedback loop connected between said current output means and said first input circuit means such that the total feedback signal being supplied to said first input circuit means is positive;

(e) non-linear impedance means positioned in at least one feedback loop between said current output means and said first input circuit means and responsive to the amplitude of the equipment output current for controlling the total feedback signal supplied to the first input circuit means, the impedance of said non-linear impedance means varying non-linearly with changes in said amplitude to prevent uncontrolled excursions of the signals being generated in the forward path.

2. Current supply equipment as set forth in claim 1, wherein each forward path includes amplification means for generating amplified output signals.

3. Current supply equipment as claimed in claim 2, in which the positive feedback loop comprises a frequency determining circuit which includes a resonant circuit for determining the frequency of signals in the forward paths and said non-linear impedance means in tandem, in the order recited, from the said output circuit to the said first input circuit means.

4. Current supply equipment as claimed in claim 3 in which a negative feedback loop is provided in parallel with the said tandem.

5. The current supply equipment claimed in claim 2 in which one positive feedback loop and one negative feedback loop are provided; said non-linear impedance means being positioned in said negative feedback loop.

6. Current supply equipment as claimed in claim 2 in which the said first input circuit means and the said second output circuit means comprise hybrid transformers arranged to divide and combine, respectively, the signals, among said forward transmission paths in phase; a network having a resistor for minimizing mutual interference between the forward paths connected to each of said transformers; each of said transformers comprising a differential winding to which the forward transmission paths are connected.

7. Current supply equipment as claimed in claim 6 in which at least one of said transformers comprises a further winding, said network being connected exclusively thereto.

8. Current supply equipment as claimed in claim 6 in which said network is connected exclusively to the said differential winding.

9. Current supply equipment as claimed in claim 2 wherein the output circuit means coupled to the output of each said forward paths derives from each forward path a portion of the signals to be fed back.

References Cited by the Examiner

UNITED STATES PATENTS

| | | | |
|---|---|---|---|
| 2,751,518 | 6/1956 | Pierce | 331—82 X |
| 3,114,886 | 12/1963 | De Santis et al. | 331—82 X |
| 3,117,288 | 1/1964 | Modiano | 331—183 X |

ROY LAKE, *Primary Examiner.*